United States Patent
Hari et al.

(10) Patent No.: US 9,164,849 B2
(45) Date of Patent: Oct. 20, 2015

(54) BACKUP JOBS SCHEDULING OPTIMIZATION

(75) Inventors: Dhanalakoti Hari, Hyderabad A.P (IN); Srinivas Sanapala, Hyderabad AP (IN); Rajashekar Dasari, Hyderabad Andhra Pradesh (IN); Ganesh Kolli, Hyderabad AP (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 108 days.

(21) Appl. No.: 13/459,265

(22) Filed: Apr. 30, 2012

(65) Prior Publication Data

US 2013/0290265 A1 Oct. 31, 2013

(51) Int. Cl.
*G06F 11/14* (2006.01)
*G06F 17/30* (2006.01)

(52) U.S. Cl.
CPC ...... *G06F 11/1461* (2013.01); *G06F 17/30073* (2013.01); *G06F 11/1451* (2013.01)

(58) Field of Classification Search
CPC .................................................. G06F 17/30073
USPC ........................................................ 707/654
See application file for complete search history.

(56) References Cited

U.S. PATENT DOCUMENTS

| | | | |
|---|---|---|---|
| 6,785,786 B1 | 8/2004 | Gold et al. | |
| 7,401,194 B2 | 7/2008 | Jewell | |
| 7,788,234 B2* | 8/2010 | DePue et al. | 707/681 |
| 8,140,791 B1* | 3/2012 | Greene | 711/162 |
| 8,412,680 B1* | 4/2013 | Gokhale et al. | 707/654 |
| 8,959,056 B1* | 2/2015 | Weisgerber et al. | 707/653 |
| 2007/0136541 A1* | 6/2007 | Herz et al. | 711/162 |
| 2008/0115071 A1 | 5/2008 | Fair | |
| 2008/0154979 A1* | 6/2008 | Saitoh et al. | 707/202 |
| 2008/0184241 A1* | 7/2008 | Headrick et al. | 718/102 |
| 2009/0300633 A1* | 12/2009 | Altrichter et al. | 718/103 |
| 2011/0082837 A1* | 4/2011 | Cherkasova et al. | 707/654 |
| 2011/0082972 A1 | 4/2011 | Cherkasova et al. | |
| 2011/0276823 A1* | 11/2011 | Ueno et al. | 714/4.11 |

OTHER PUBLICATIONS

J. da Silva et al., "The Amanda Network Backup Manager," Procs. of 7th Sys. Admin. Conf., Monterey, California, Nov. 1993, pp. 171-182.

* cited by examiner

*Primary Examiner* — Brittany N Allen
(74) *Attorney, Agent, or Firm* — Michael A. Dryja

(57) ABSTRACT

Scheduling of backup jobs is optimized in accordance with a characteristic of the backup jobs. The characteristic of the backup jobs can take into account a number of the backup jobs that are stale. A stale backup job is a backup job in which no backed up data changed during a most recent performance of the backup job.

10 Claims, 4 Drawing Sheets

BACKUP JOBS SCHEDULING OPTIMIZATION

BACKGROUND

Entities like business and other types of organizations maintain computing systems that can be vitally important to the successful operation of these entities. Computing systems, however, are not infallible, and often fail. Therefore, entities typically back up data stored within the computing systems, to ensure that if there is any failure, the data itself is not lost.

DETAILED DESCRIPTION

As noted within the background section, data is typically backed up to ensure that if there is any computing system failure, the data itself is not lost. Backing up of data can be a complex affair, particularly when there are large amounts of data involved stored on and backed up over multiple different storage devices and systems. Different backup schedules may be created that are performed at different times. Each backup schedule can include multiple backup jobs, where a given backup job can identify the location and identity of data to be backed up, as well as the location to which this data is to be backed up.

Managing multitudes of such backup schedules can overwhelm even the most experienced information technology personnel. As a result, data that should be backed up may not be, data that is no longer necessary to back up may still be, and so on, particularly over time where the original storage locations of data change, and the importance of data changes. This can cause the efficiency in performance of the backup schedules to suffer, requiring that the information technology personnel painstakingly periodically review each backup schedule to determine whether its backup jobs are still accurate and assess whether the time and frequency at which each backup schedule is performed is still optimal and viable.

Techniques disclosed herein overcome these and other shortcomings by optimizing the scheduling of backup schedules. A backup schedule, or backup job group, includes multiple backup jobs. The scheduling of such a backup job group is optimized in accordance with a determined or assessed characteristic of the backup job group. This characteristic can take into account the number of stale backup jobs within the backup job group. A stale backup job is a backup job in which no backed up data changed during a most recent performance of the backup job. The characteristic can further depend or be based on whether the backup job group includes incremental or full backup jobs. An incremental backup job is a backup job in which data is backed up just if the data has changed from a most recent performance of the backup job, whereas a full backup job is a backup job in which data is backed up regardless of whether the data has changed from the most recent performance of the backup job.

For instance, a backup job group that has stale backup jobs that have mostly if not all failed can be identified as a candidate for rescheduling, temporary suspension, or even deletion. At the very least, identification of such a backup job group can warrant the attention of information technology personnel to determine why the stale backup jobs are failing so often. The rescheduling, temporary suspension, or deletion of such a backup job group may be performed automatically without user interaction, or a recommended optimization may be provided to a user who is permitted to accept, reject, or modify the suggested course of action.

Figure 1:
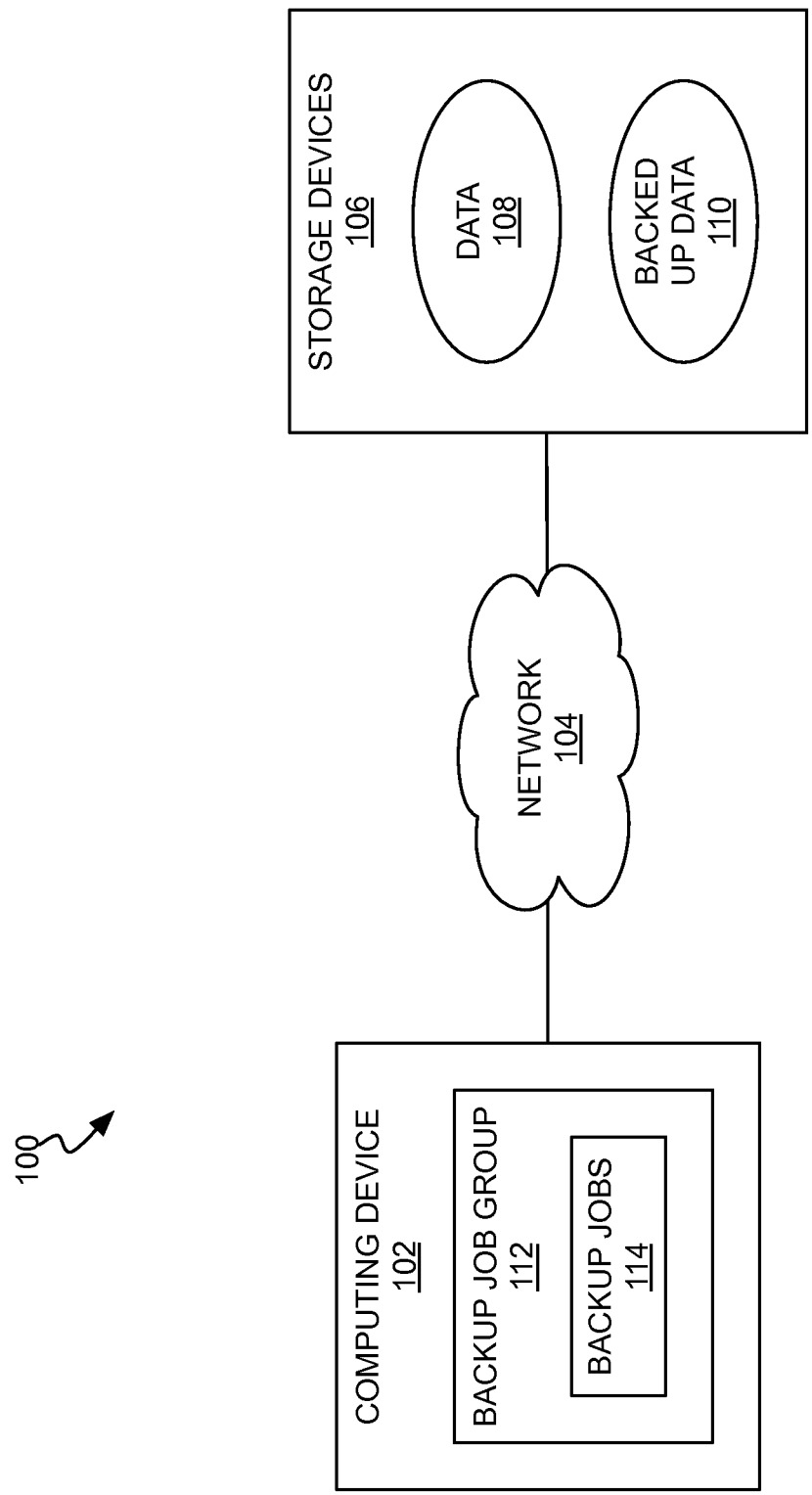
FIG. 1 is a diagram of an example system in which scheduling of backup jobs is optimized.

FIG. 1 shows an example system 100 in relation to which backup job group scheduling can be optimized. The system 100 includes a computing device 102, a network 104, and one or more storage devices 106. The computing device 102 may include or be one or more computers, and is communicatively connected to the storage devices 106 over the network 104. In another implementation, one or more of the storage devices 106 may be directly connected to or a part of the computing device 102. The network 104 may be or include networks as diverse as the Internet, intranets, extranets, local-area networks (LANs), wide-area networks (WANs), mobile telephony networks, storage-area networks (SANs) and so on.

The storage devices 106 store data 108, as well as backed up data 110, which is the backed up version of the data 108. The storage devices 106 can be or include hard disk drives, solid state drives, and other types of non-volatile storage devices. The storage devices 106 may be configured for redundancy in accordance with redundant array of independent disk (RAID) methodologies and other types of methodologies. The storage devices 106 may be organized as storage subsystems of a SAN, may be independently accessible and/or addressable storage devices, and so on.

The computing device 102 includes data representative of at least one backup job group 112. A backup job group 112 includes a number of backup jobs 114. A backup job 114 identifies the data 108 and the location of this data 108 (i.e., such as which copy thereof stored on which storage device 108) to be backed up. A backup job 114 also identifies the location to which this identified data 108 is to be backed up. The backup job group 112 has a schedule, and as such the backup job group 112 can be referred to as a backup schedule. The backup job group 112 further specifies whether the backup jobs 114 of the backup job group 112 are full or incremental.

The schedule of the backup job group 112 specifies how often the backup jobs 114 of the backup job group 112 are to be performed. The schedule can be specified in a number of different ways. For instance, the schedule may specify the actual days of the week or month, as well as the time, at which the backup jobs 114 are to be performed. As another example, the schedule may specify the frequency at which the backup jobs 114 are to be performed, on a more numerical basis, such as every day, every other day, every hour, and so on.

When the backup job group 112 specifies that its backup jobs 114 are full backup jobs, this means that each time the backup jobs 114 are performed, all the data of each backup job 114 is backed up, regardless of whether the data has changed since the last time the backup jobs 114 were performed. By comparison, when the backup job group 112 specifies that its backup jobs 114 are incremental backup jobs, this means that each time the backup jobs 114 are performed, just the data of each backup job 114 that has changed since the last time the backup jobs 114 were performed is backed up. In some implementations, the backup jobs 114 of a backup job group 112 are each an incremental backup job or a full backup job, such that a given backup job group 112 does not include both incremental backup jobs and full backup jobs.

As a more concrete if simplistic example, a backup job 114 may specify that four particular data files are to be backed up from one storage device 106 to another storage device 106. After a given time the backup job 114 has been run, one of the four data files may have changed. If the backup job 114 is incremental, the next time the backup job 114 is run just this changed data file is backed up. By comparison, if the backup job 114 is full, the next time the backup job 114 is run all four data files are still backed up, even the three data files that have not changed since the last time the backup job 114 was run.

A backup job 114 is considered stale if the data that is to be backed up has not changed since the last time the backup job 114 was run, regardless of whether the backup job 114 is incremental or full. For instance, in the example described in the previous paragraph, the backup job 114 in question is not stale, because one of the four data files has changed. If none of the four data files changed, then the backup job 114 is a stale backup job. The backup job 114 is stale in this case even if it is a full backup job, such that the four data files are backed up even though none of them have changed.

The computing device 102 causes or initiates performance of the backup jobs 114 of the backup job group 112, or performs these backup jobs 114 itself, as dictated by the schedule of the backup job group 112, where the backup jobs 114 are performed as full or incremental backup jobs as specified by the backup job group 112 as well. Periodically, the computing device 102 optimizes the scheduling of the backup job group 112. In general, such scheduling optimization is achieved based on a characteristic of the backup job group 112. This characteristic can take into account the number of the backup jobs 114 that are stale. Particular example methodologies by which scheduling optimization can be achieved are now described.

Figure 2:
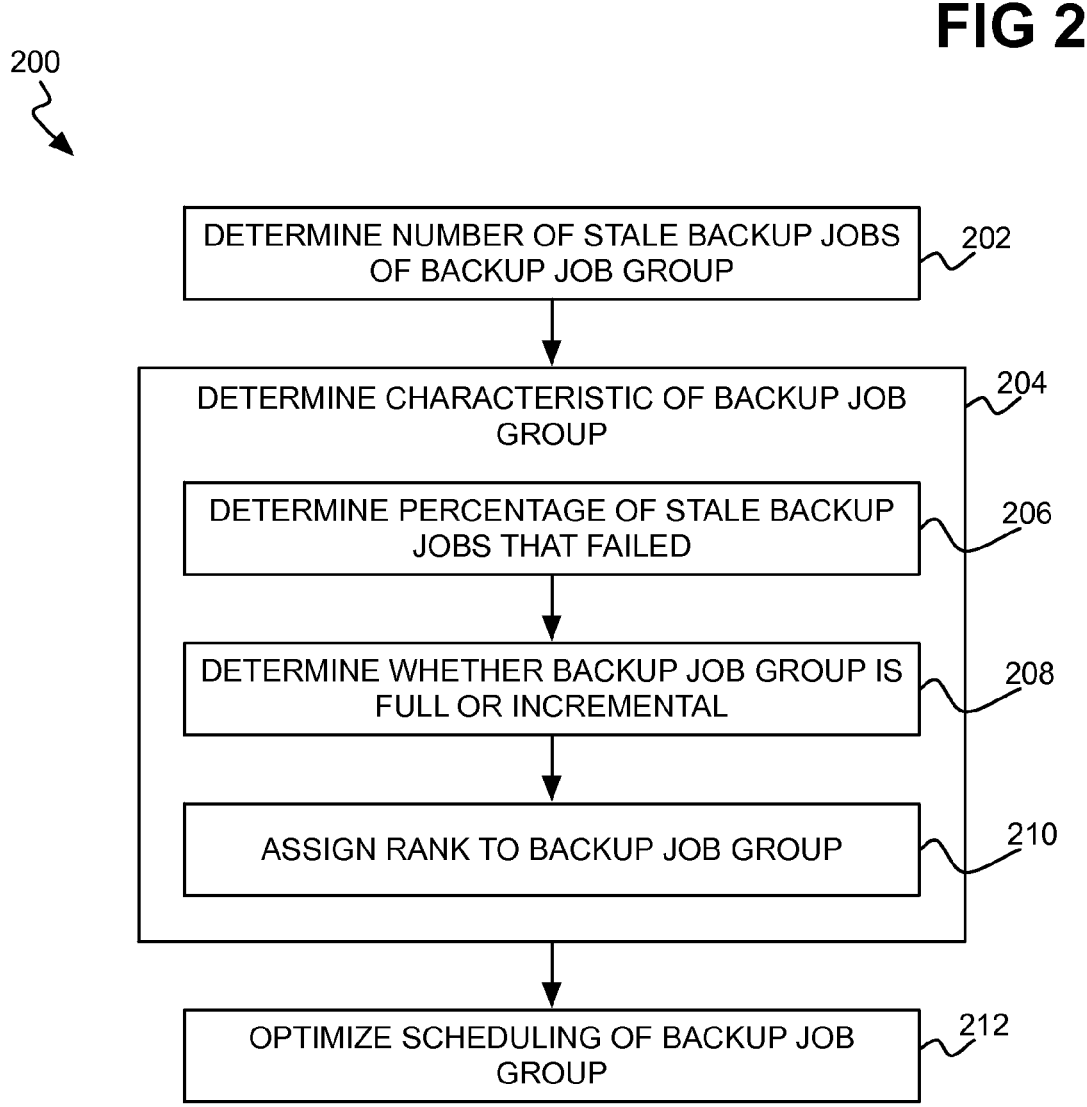
FIG. 2 is a flowchart of an example method for optimizing scheduling of backup jobs.

FIG. 2 shows an example method 200 for optimizing the scheduling of a single backup job group 112. The method 200 can be implemented as a computer program stored on a non-transitory computer-readable data storage medium and that is executed by a processor. The computing device 102 can perform the method 200, for instance.

The number of stale backup jobs 114 of the backup job group 112 is determined (202). This information can be collected during performance of the backup jobs 114 of the backup job group 112, for instance. As each backup job group 112 is completed, if none of the data 108 identified by the backup job group 112 in question has changed since the last time the backup job group 112 was run, then the backup job group 112 is stale. Other information that can be collected during performance of the backup jobs 114 is whether each backup job 114 completed successfully or unsuccessfully.

A backup job 114 is considered as having completed successfully if the data 108 identified by the backup job 114 has been successfully backed up. Otherwise, the backup job 114 is considered to have failed. A backup job 114 can fail for a variety of different reasons. The connection within the network 104 interconnecting the storage device 106 storing the data 108 and the storage device 106 to store the backed up data 110 may experience a failure. This type of failure may be predicated based on an actual physical failure within the storage devices 106 in question or within the network 104, or because of the network 104 and/or either or both of the storage devices 106 may be experiencing overutilization during the attempted backup. Other types of failures may be due to the fact that the backup job 114 in question has a lower priority in execution than other backup jobs 114 or other usages of the storage devices 106 in question when the backup job 114 is to be performed.

A characteristic of the backup job group 112 (i.e., of the backup jobs 114 of this backup job group 112) is determined or assessed (204). The characteristic can take into account the number of stale backup jobs 114 within the backup job group 112, as determined in part 202. As one example implementation, the characteristic of the backup job group 112 is determined as follows.

The percentage of stale backup jobs 114 that failed is determined or assessed (206). For example, there may be fifty total backup jobs 114 within the backup job group 112. Of these fifty backup jobs 114, twenty may be stale. Of the twenty stale backup jobs 114, twelve may have failed. Therefore, the percentage of stale backup jobs 114 is twelve divided by twenty, or 60%. In general, the percentage of stale backup jobs 114 that failed is calculated as the number of stale backup jobs 114 that failed divided by the total number of stale backup jobs 114. As such, the non-stale backup jobs 114 are not considered in this calculation.

Whether the backup jobs 114 of the backup job group 112 are full or incremental backup jobs is also determined or assessed (208). As noted above, in some implementations a backup job group 112 includes just full backup jobs 114 or incremental backup jobs 114, and not both. Where a backup job group 112 includes both incremental and full backup jobs 114, the backup job group 112 may be logically divided into two separate backup job groups 112 for the purposes of the method 200, one including just the incremental backup jobs 114, and one including just the full backup jobs 114. Both of such backup job groups 112 would have in this approach the same schedule, however, as to when their backup jobs 114 are performed, since they effectively inherent the schedule their parent backup job group 112 from which these two backup job groups 112 were divided.

A rank is assigned to the backup job group 112 (210), and may be considered the characteristic of the backup job group 112 in this implementation. The rank is assigned based on the percentage of stale backup jobs 114 within the backup job group 112, and/or whether the backup jobs 114 of the backup job group 112 are full or incremental. For instance, a backup job group 112 including incremental backup jobs 114 may be assigned a higher rank than a backup job group 112 including full backup jobs 114.

In one example implementation, there are six different ranks, from a highest rank to a lowest rank. The highest rank is assigned where the percentage of stale backup jobs 114 is 100%, and the backup jobs 114 are incremental. The next highest rank is assigned where the percentage of stale backup jobs 114 is again 100%, but the backup jobs 114 are full. The third highest rank is assigned where the percentage of stale backup jobs 114 is greater than 0% but less than 100%, and the backup jobs 114 are incremental. The fourth highest rank is assigned where the percentage of stale backup jobs 114 is again greater than 0% but less than 100%, but the backup jobs 114 are full. The fifth highest rank is assigned where the percentage of stale backup jobs 114 is 0%, and the backup jobs 114 are incremental. The sixth highest rank is assigned where the percentage of stale backup jobs 114 is again 0%, but where the backup jobs 114 are full.

Once the characteristic of the backup job group 112 has been determined or assessed, the scheduling of the backup job group 112 is optimized (212), based or depending on, or in accordance with, this characteristic. For instance, the scheduling may be optimized based or depending on the percentage of stale backup jobs 114 and on whether the backup jobs 114 are full or incremental. The scheduling may thus be optimized in accordance with the rank that has been assigned to the backup job group 112. In general, the aggressiveness with which the scheduling of the backup job group 112 (i.e., its constituent backup jobs 114) is optimized is in accordance with its rank, such that the higher ranked the backup job group 112, the more aggressive its scheduling is optimized, and the lower ranked the backup job group 112, the less aggressive its scheduling is optimized.

Scheduling optimization can include deleting, suspending, or rescheduling the backup job group 112, where deleting is more aggressive than suspending, and suspending is more aggressive than rescheduling. Deleting the backup job group 112 means removing the backup job group 112 and its constituent backup jobs 114, such that these backup jobs 114 are no longer performed. Suspending the backup job group 112 means temporarily stopping performance of the backup job group 112 and its constituent backup jobs 114, although the backup job group 112 may later be resumed. Rescheduling the backup job group 112 means changing the times and/or frequency at which the backup job group 112 is performed, such that its constituent backup jobs 114 are performed at a different time and/or frequency.

Scheduling optimization can be performed with or without user interaction. In the former case, a recommended optimization of the schedule of the backup job group 112 in question may be proposed to a user. The user is then provided with the opportunity to accept, reject, or modify the suggested optimization. In the latter case, the recommendation optimization of the schedule of the backup job group 112 is effectuated automatically without user involvement. A combination of these two approaches may further be employed. For instance, rescheduling may be performed automatically without user interaction, whereas suspension and/or deletion may be achieved by first presenting such a proposed optimization to the user for confirmation.

Figure 3:
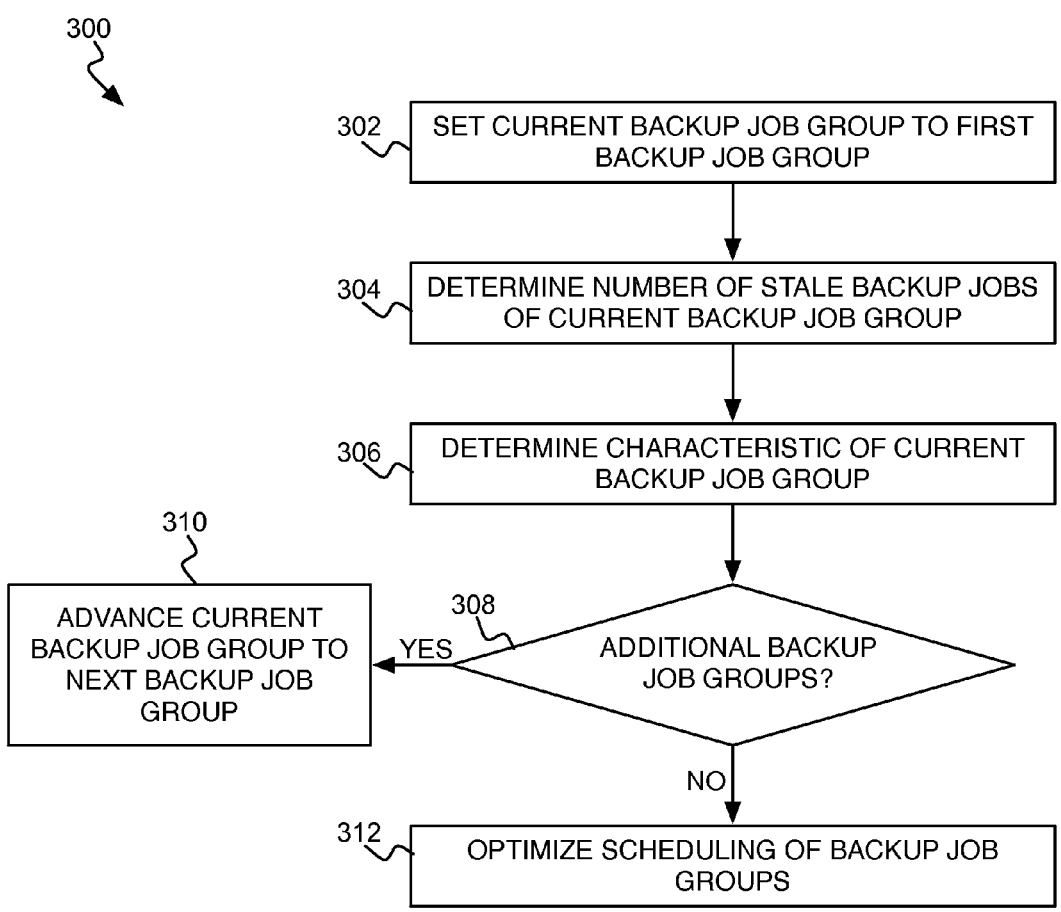
FIG. 3 is a flowchart of an example method for optimizing scheduling of multiple groups of backup jobs.

FIG. 3 shows an example method 300 for optimizing the scheduling of multiple backup job groups 112. As with the method 200, the method 300 can be implemented as a computer program stored on a non-transitory computer-readable data storage medium and that is executed by a processor. The computing device 102, for instance, can perform the method 300.

What is referred to as a current backup job group 112 is set to the first backup job group (302). The number of stale backup jobs 114 of the current backup job group 112 is determined (304), as described above in relation to part 202 of the method 200. A characteristic of the current backup job group 112 is then determined (306), in a manner such as has been described in relation to part 204 of the method 200. If there is any additional backup job group 112 (308) for which a characteristic has not yet been determined, then the current backup job group 112 is advanced to the next backup job group 112 (310), and the method 300 is repeated at part 304.

Once all the backup job groups 112 have each had a characteristic determined or assessed therefor, the method 300 proceeds from part 308 to optimizing the schedule of the multiple backup job groups 112 (312). The schedules of the backup job groups 112 may be optimized independently or interdependently of one another. For example, the backup job groups 112 may be ordered by their ranks, and just the highest ranked backup job groups 112 have their schedules optimized. Other approaches can also be employed to ensure that each backup job group 112 has its schedule optimized not in a vacuum, but in consideration of the characteristics determined for the other backup job groups 112.

By optimizing the schedules of the backup job groups 112, the methods 200 and 300 can ensure the following advantageous technical effects, among others. First, resource utilization in performing backups can be reduced, because backup job groups 112 may be rescheduled for less frequent performance, or may be temporarily suspended or deleted. Second, confidence that important data is indeed being backed up can increase, because backup job groups 112 that are failing may be rescheduled, for instance, so that they are performed at times when they are less likely to fail.

In some implementations, the scheduling of the backup job groups 112 can be optimized based on characteristics that do not necessarily take into account of or are based or dependent on the number of stale backup jobs 114 within the backup job groups 112. For example, just the failure or success rates of the backup jobs 114 within each backup job group 112 may be considered in determining or assessing the characteristic. In general, then, the techniques disclosed herein can be applied to scheduling optimization for backup jobs 114 in ways other than consideration of the backup jobs 114 that are stale.

Figure 4:
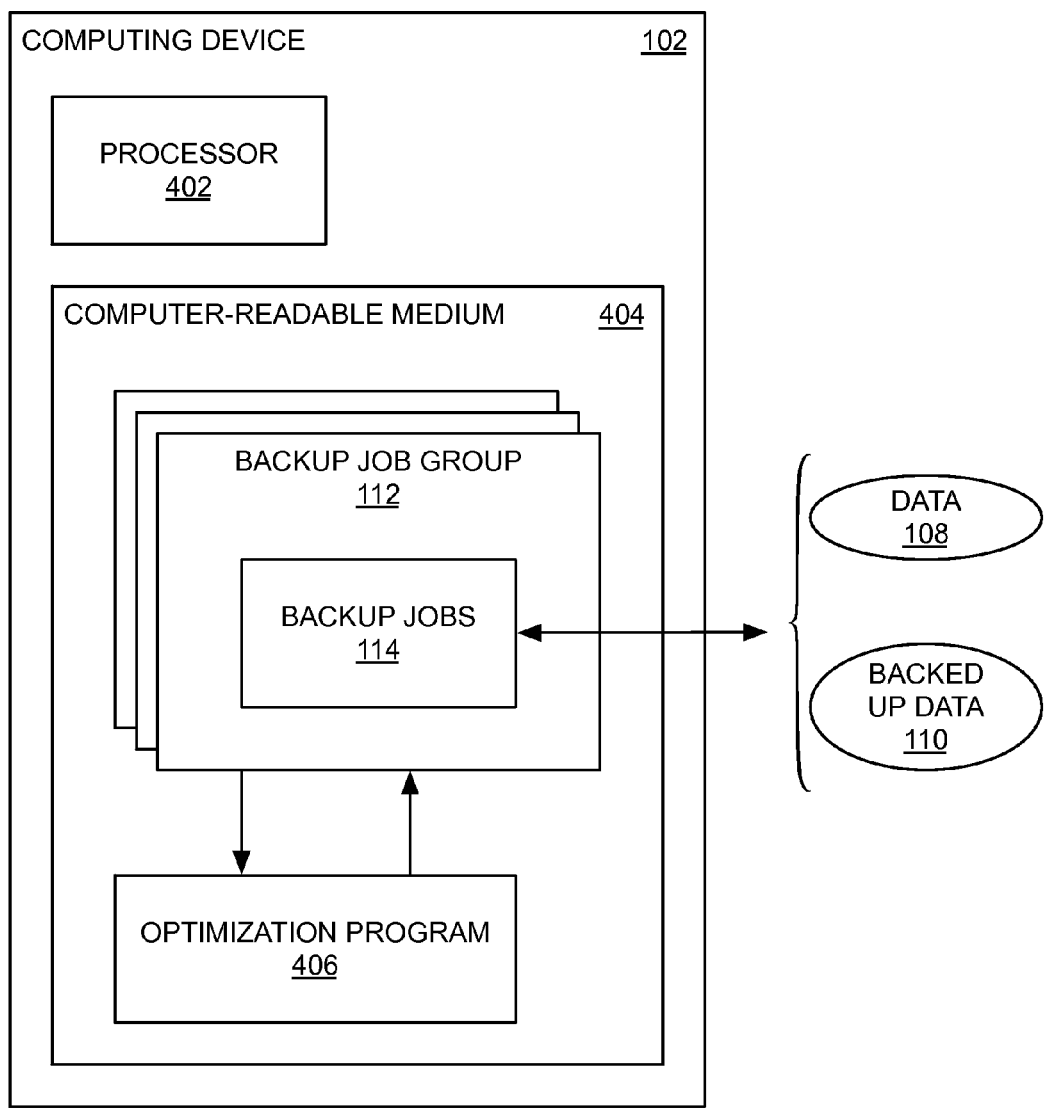
FIG. 4 is a diagram of an example computing device for optimizing scheduling of backup jobs.

FIG. 4 shows an example implementation of the computing device 102. The computing device 102 includes at least a processor 402 and a non-transitory computer-readable data storage medium 404, which may also more generally be referred to as a computer-readable medium 404. The computer-readable medium 404 may be or include a volatile medium, such as dynamic random access semiconductor memory, and/or a non-volatile medium, such as a hard disk drive or a solid state drive, for instance.

The computer-readable medium 404 stores the backup job groups 112 as data, where each backup job group 112 includes backup jobs 114. The backup jobs 114 of the backup job groups 112 are performed or executed in relation to the data 108 to create the backed up data 110, as has been described. The backup jobs 114 may be executed within the computing device 102 itself, or by a different computing device.

The computer-readable medium 404 stores an optimization computer program 406, which is also referred to as an optimization program 406. The optimization program 406 is executed by the processor 402. Execution of the optimization program 406 causes scheduling of the backup job groups 112 to be optimized. For instance, the optimization program 406 can encode the logic that results in the method 200 and/or the method 300 to be performed in one implementation.

We claim:

1. A method comprising, by a processor:

determining a number of stale backup jobs of a plurality of backup jobs, a stale backup job being a backup job in which no backed up data changed during a most recent performance of the backup job, each backup job being one of an incremental backup job and a full backup job;

determining a percentage of the stale backup jobs that failed to execute successfully during the most recent performance thereof;

assigning a highest rank to the backup jobs that are incremental and the percentage of the stale backup jobs that failed to execute successfully is 100%;

assigning a second highest rank to the backup jobs that are full and the percentage is 100%;

assigning a third highest rank to the backup jobs that are incremental and the percentage is greater than 0% and less than 100%;

assigning a fourth highest rank to the backup jobs that are full and the percentage is greater than 0% and less than 100%;

assigning a second lowest rank to the backup jobs that are incremental and the percentage is 0%; and assigning a lowest rank to the backup jobs that are full and the percentage is 0%; and optimizing scheduling of the backup jobs in accordance with the rank of the backup jobs.

2. The method of claim 1, wherein the scheduling of the plurality of backup jobs is optimized more aggressively where the backup jobs have been assigned a higher rank, and is optimized less aggressively where the backup jobs have been assigned a lower rank.

3. The method of claim 1, wherein optimizing the scheduling of the plurality of backup jobs comprises automatically optimizing the scheduling of the plurality of backup jobs without user interaction.

4. The method of claim 1, wherein optimizing the scheduling of the plurality of backup jobs comprises determining whether to one of:
   reschedule the plurality of backup jobs so that the plurality of backup jobs are still performed but at one or more of a different time and a different frequency;
   suspend the plurality of backup jobs so that the plurality of backup jobs are temporarily not performed;
   delete the plurality of backup jobs so that the plurality of backup jobs are no longer performed.

5. The method of claim 1, wherein optimizing the scheduling of the plurality of backup jobs comprises rescheduling the plurality of backup jobs so that the plurality of backup jobs are still performed but at one or more of a different time and a different frequency.

6. The method of claim 1, wherein optimizing the scheduling of the plurality of backup jobs comprises suspending the plurality of backup jobs so that the plurality of backup jobs are temporarily not performed.

7. The method of claim 1, wherein optimizing the scheduling of the plurality of backup jobs comprises deleting the plurality of backup jobs so that the plurality of backup jobs are no longer performed.

8. A non-transitory computer-readable data storage medium storing a computer program executable by a processor to perform a method comprising:
   for each backup job group of a plurality of backup job groups, each backup job group including a plurality of backup jobs, each backup job being one of an incremental backup job and a full backup job,
   determining a number of stale backup jobs of the plurality of backup jobs of the backup job group, a stale backup job being a backup job in which no backed up data changed during a most recent performance of the backup job;
   determining a percentage of the stale backup jobs that failed to execute successfully during the most recent performance thereof;
   assigning a highest rank to the backup jobs that are incremental and the percentage of the stale backup jobs that failed to execute successfully is 100%;
   assigning a second highest rank to the backup jobs that are full and the percentage is 100%;
   assigning a third highest rank to the backup jobs that are incremental and the percentage is greater than 0% and less than 100%;
   assigning a fourth highest rank to the backup jobs that are full and the percentage is greater than 0% and less than 100%;
   assigning a second lowest rank to the backup jobs that are incremental and the percentage is 0%; and
   assigning a lowest rank to the backup jobs that are full and the percentage is 0%; optimizing scheduling of the backup job groups in accordance with the rank of the backup jobs.

9. A system comprising:
a computing device to communicatively connect to a plurality of storage devices within which data is backed up;
a processor of the computing device;
a computer-readable medium of the computing device storing a computer program executable by the processor to optimize scheduling of a plurality of backup jobs, performance of the plurality of backup jobs resulting in backing up of the data within the plurality of storage devices, the backup jobs including a number of stale backup jobs being a backup job in which no backed up data changed during a most recent performance thereof, each backup job having a backup job type as one of an incremental backup job and a full backup job,
   wherein optimization includes determining the number of stale backup jobs, and a percentage of the stale backup jobs that failed to execute successfully during the most recent performance thereof,
   wherein the scheduling of the backup jobs is optimized in accordance with a rank corresponding to a combination of backup job type and most recently failed execution rate of stale backup jobs,
   wherein a highest rank is assigned to the backup jobs that are incremental and a percentage of the stale backup jobs that failed to execute successfully is 100%,
   wherein a second highest rank is assigned to the backup jobs that are full and the percentage is 100%,
   wherein a second lowest rank is assigned to the backup jobs that are incremental and the percentage is 0%,
   wherein a third highest rank is assigned to the backup jobs that are incremental and the percentage is greater than 0% and less than 100%,
   wherein a fourth highest rank is assigned to the backup jobs that are full and the percentage is greater than 0% and less than 100%,
   and wherein a lowest rank is assigned to the backup jobs that are full and the percentage is 0%.

10. The system of claim 9, wherein the characteristic of the plurality of backup jobs depends on the number of stale backup jobs of the plurality of backup jobs.

* * * * *